(12) United States Patent
Chipman et al.

(10) Patent No.: US 8,421,711 B2
(45) Date of Patent: Apr. 16, 2013

(54) POLARIZATION COUPLING CUBE-CORNER RETRO-REFLECTORS

(75) Inventors: Russell A. Chipman, Tucson, AZ (US); Karlton Crabtree, Tucson, AZ (US)

(73) Assignee: The Arizona Board of Regents on Behalf of the University of Arizona, Tucson, AZ (US)

( * ) Notice: Subject to any disclaimer, the term of this patent is extended or adjusted under 35 U.S.C. 154(b) by 1239 days.

(21) Appl. No.: 12/092,170

(22) PCT Filed: Nov. 1, 2006

(86) PCT No.: PCT/US2006/042640
§ 371 (c)(1),
(2), (4) Date: Sep. 24, 2008

(87) PCT Pub. No.: WO2007/053677
PCT Pub. Date: May 10, 2007

(65) Prior Publication Data
US 2009/0219618 A1 Sep. 3, 2009

Related U.S. Application Data

(60) Provisional application No. 60/732,089, filed on Nov. 1, 2005.

(51) Int. Cl.
*G09G 3/00* (2006.01)

(52) U.S. Cl.
USPC .......................................... 345/32; 359/529

(58) Field of Classification Search .............. 345/32, 345/175; 359/515, 529, 489.01, 630, 629
See application file for complete search history.

(56) References Cited

U.S. PATENT DOCUMENTS

| | | | |
|---|---|---|---|
| 4,912,530 A | | 3/1990 | Bessho |
| 5,710,845 A | * | 1/1998 | Tajima ............................ 385/16 |
| 6,157,486 A | * | 12/2000 | Benson et al. ........... 359/487.05 |
| 6,198,574 B1 | * | 3/2001 | Hill ........................ 359/485.06 |
| 6,549,283 B2 | | 4/2003 | Eckert |
| 6,816,141 B1 | | 11/2004 | Fergason |
| 6,871,982 B2 | | 3/2005 | Holman et al. |
| 6,894,814 B2 | | 5/2005 | Popovich et al. |
| 6,947,618 B2 | | 9/2005 | Martinelli et al. |
| 7,121,671 B2 | | 10/2006 | Lee et al. |

(Continued)

FOREIGN PATENT DOCUMENTS

| | | |
|---|---|---|
| JP | 10-512684 | 12/1998 |
| JP | 2005-128241 | 5/2005 |
| JP | 2005-173622 | 6/2005 |
| JP | 2005-241692 | 9/2005 |
| WO | WO 96/12978 | 5/1996 |

OTHER PUBLICATIONS

Search Report issued Oct. 7, 2010, in European Patent Application No. 06827272.3-2217/1946290.

*Primary Examiner* — Kimnhung Nguyen
(74) *Attorney, Agent, or Firm* — Oblon, Spivak, McClelland, Maier & Neustadt, L.L.P.

(57) ABSTRACT

A cube corner retro-reflector that includes three mutually perpendicular reflecting planes arranged in a pyramidal configuration, wherein at least one of the reflecting planes has a non-isotropic surface causing a polarization state of a ray exiting the cube corner retro-reflector to be orthogonal or substantively orthogonal to a polarization state of a ray entering the cube corner retro-reflector for all linear polarization orientations.

16 Claims, 10 Drawing Sheets

U.S. PATENT DOCUMENTS

| | | |
|---|---|---|
| 2003/0007151 A1 | 1/2003 | Eckert |
| 2003/0161029 A1 | 8/2003 | Kurtz et al. |
| 2003/0223080 A1* | 12/2003 | Hill .............................. 356/500 |
| 2004/0057091 A1 | 3/2004 | Popovich et al. |
| 2004/0218390 A1 | 11/2004 | Holman et al. |
| 2004/0228567 A1 | 11/2004 | Martinelli et al. |
| 2006/0262402 A1* | 11/2006 | Lee et al. ...................... 359/529 |
| 2007/0035835 A1* | 2/2007 | Hadden ........................ 359/529 |

* cited by examiner

40

POLARIZATION COUPLING CUBE-CORNER RETRO-REFLECTORS

CROSS-REFERENCE TO RELATED APPLICATIONS

This application is based upon and claims the benefit of priority to U.S. Provisional Application No. 60/732,089, filed Nov. 1, 2005, which is incorporated herein by reference.

BACKGROUND OF THE INVENTION

1. Field of the Invention

The present invention relates generally to polarization-state-altering cube corners, and more particularly to methods and apparatuses for cube corners which rotate all linear polarizations by 90°, called linear polarization orthogonalization.

2. Discussion of the Background

A variety of applications, such as detection of objects passing a sensor (objects on a conveyor belt, cars at a toll booth, etc), and distance measurement, require an optical system as follows. The system is illuminated, by a lamp, laser or other optics, henceforth called the "source". Some fraction of the irradiance from this source is transmitted through a beam splitter, and then over some path to a cube-corner retro-reflector. The irradiance returns to the beam splitter along the same path, and the beam is partially reflected by the beam splitter. This reflected irradiance then exits the system, either by absorption by a detector, or by passing into other optics. This exit is henceforth referred to as the "detector".

On some systems, a non-polarizing beam splitter is used. Those skilled in the art will recognize that two passes through such a beam splitter results in a maximum of 25% of the source irradiance present at the detector. An illustration of such a system incorporating a non-polarizing beam splitter is shown in FIG. 1. FIG. 1 illustrates irradiance entering the system 1. The irradiance is split by the non-polarizing beam splitter 2. Fifty percent of the irradiance exits the system at 3 while the other fifty percent enters the cube-corner 4. The cube corner 4 then returns the irradiance and half the irradiance returns to the source 5 (25% of the original irradiance) and the other half reaches the system exit 6. Other systems use a polarizing beam splitter. The efficiency of these systems varies with the polarization properties of the retro-reflector. Some systems use a dielectric total internal reflection cube-corner, whose polarization properties depend on the refractive index, but to first order are depolarizers, due to the large polarization changes which are different in each of the hexads. These systems can have 50% of the source irradiance present at the detector. Such a system is shown in FIG. 2. FIG. 2 illustrates p-polarized irradiance entering the system 7. Because the p-polarized irradiance enters a polarized beam splitter ("PBS") 8, the entire entering irradiance exits the PBS 9 and enters the cube corner 10. The polarized irradiance then exits the cube corner 10 as depolarized irradiance 11. The p-polarized portion of the irradiance is then lost by returning to the source 12 (approximately 50% of irradiance entering the system). The s-polarized irradiance exits the system 13 (also approximately 50% of irradiance entering the system). For hollow metal coated cube-corners, the polarization state at the detector is nearly the same as the source polarization state, resulting in little irradiance present at the detector. This is shown in FIG. 3, where it is illustrated that the cube-corner with metallic coating 14 produces p-polarized irradiance 15 exiting the metallic coating cube-corner 14 and the p-polarized irradiance exiting the system 16 with 100% of the irradiance returning to the source (lost). Some systems place a quarter-wave linear retarder in the optical path, as is shown in FIG. 4. In FIG. 4, p-polarized irradiance 7 enters the PBS 8 with the entire entering irradiance exiting the PBS 9 and entering a quarter wave linear retarder ("QWLR") with fast axis oriented at 45 degrees to incident polarization 17. The irradiance exits the QWLR as right circular polarized light incident on the cube corner with metallic coatings 19. The irradiance then exits the cube corner 19 as left circular polarized irradiance 20 and re-enters the QWLR 17. The irradiance then exits the QWLR 17 in s-polarized form 21. As the irradiance is s-polarized, 100% of the entering irradiance exits the system and none is lost by returning to the source. Thus, in principle, adding a quarter-wave linear retarder allows 100% linear polarization coupling with the metal coated cube corner. However this adds cost and complexity to the system, since the waveplate must be carefully aligned. In practice, systems have not approached 80% polarization coupling.

SUMMARY OF THE INVENTION

Accordingly, in one embodiment of the present invention, the cube-corner is polarization orthogonalized. Thus the light retro-reflected has a polarization state which is always orthogonal to any incident linear polarization state. Such a system allows 100% of the source irradiance to reach the detector without the added complexity of a quarter wave linear retarder. FIG. 5 illustrates the p-polarized irradiance 7 entering the PBS 8 with the entire entering irradiance exiting the PBS 9. The irradiance then enters the polarization orthogonalizing cube-corner 23. As a result, the irradiance exits the cube-corner as s-polarized irradiance 24. Thus, when the s-polarized irradiance re-enters the PBS 9, 100% of the entering irradiance is able to exit the system 25. Note the corner cube does not need to assume a particular angular orientation. Such, a system can operate with ¼ the optical power of the system of FIG. 1 or ½ the power of FIG. 2 at equivalent signal to noise, or it can offer longer distances through lossier media than other systems.

Accordingly, one object of the present invention is to provide a cube corner retro-reflector performing linear polarization orthogonalization, comprising: three mutually perpendicular reflecting planes arranged in a pyramidal configuration, wherein at least one of the reflecting planes has a non-isotropic surface causing a polarization state of a ray exiting the cube corner retro-reflector to be orthogonal or substantively orthogonal to a polarization state of a ray entering the cube corner retro-reflector for any incident linear polarization orientation.

In another embodiment of the present invention, at least one reflecting plane has at least one sub-wavelength grating.

In another embodiment of the present invention, at least one reflecting plane has a birefringent coating.

In another embodiment of the present invention, each reflecting plane has a surface with a retardance of 180 degrees oriented in the p-plane of the surface of the reflecting plane with an ellipticity angle of 27.5%. i.e., each interface acts as a half wave elliptical retarder with Stokes eigenvector of approximately {1, 0.57, 0, 0.82}.

In another embodiment of the present invention, each reflecting plane has a surface with a linear retardance of 180° oriented at 45° with respect to the s and p planes of the surface of the reflecting plane, i.e., each interface acts as a half wave linear retarder with the retardance eigenstates oriented at ±45° with respect to the s and p polarization states.

In another embodiment of the present invention, each reflecting plane has an anisotropic surface with a linear retardance of ±70.52°=arccos (⅓) with polarization eigenstates in the s and p planes. In this embodiment, the anisotropy of the surface causes the retardance to change, depending on the azimuthal angle. If the retardance is positive 70.52° for an azimuthal angle of zero, the retardance will be negative 70.52° for an azimuthal angle of 90°.

In another embodiment of the present invention, at least one reflecting plane has an anisotropic surface with polarization eigenstates not aligned with the s and p planes where the Mueller matrix of any or all the hexads is equal or close to the ideal linear polarization orthogonalizing Mueller matrix $$\begin{pmatrix} 1 & 0 & 0 & 0 \\ 0 & -1 & 0 & 0 \\ 0 & 0 & 1 & 0 \\ 0 & 0 & 0 & -1 \end{pmatrix}.$$

According to another aspect of the present invention, each reflective plane has a diattenuating surface.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, in which like reference numerals refer to identical or corresponding parts throughout the several views, and in which:

FIGS. 9 and 10 represent two slices through the solution space for this invention; other slices correspond to other latitudes on the Poincaré sphere.

DETAILED DESCRIPTION OF THE PREFERRED EMBODIMENTS

Figure 1:
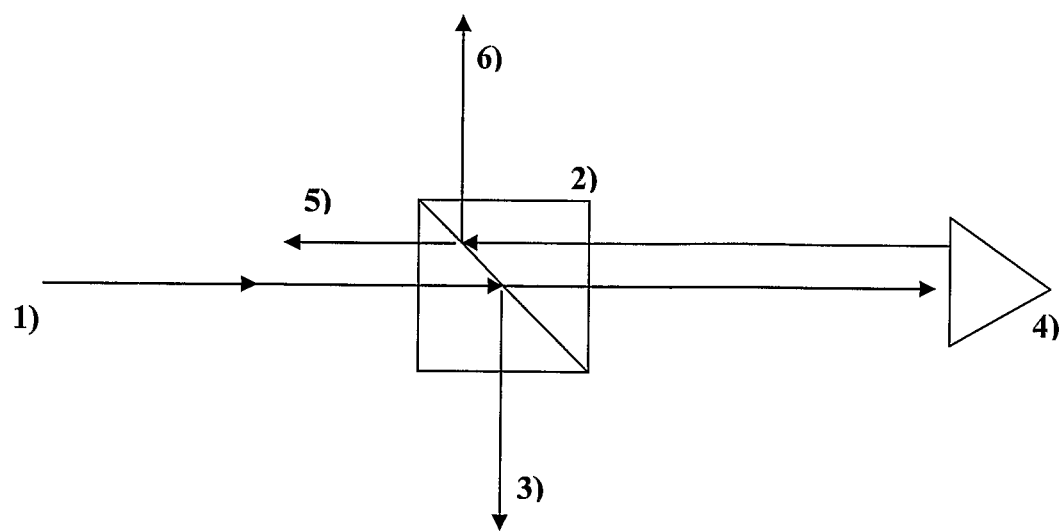
FIG. 1 illustrates a system utilizing a non-polarizing beam splitter.
Figure 2:
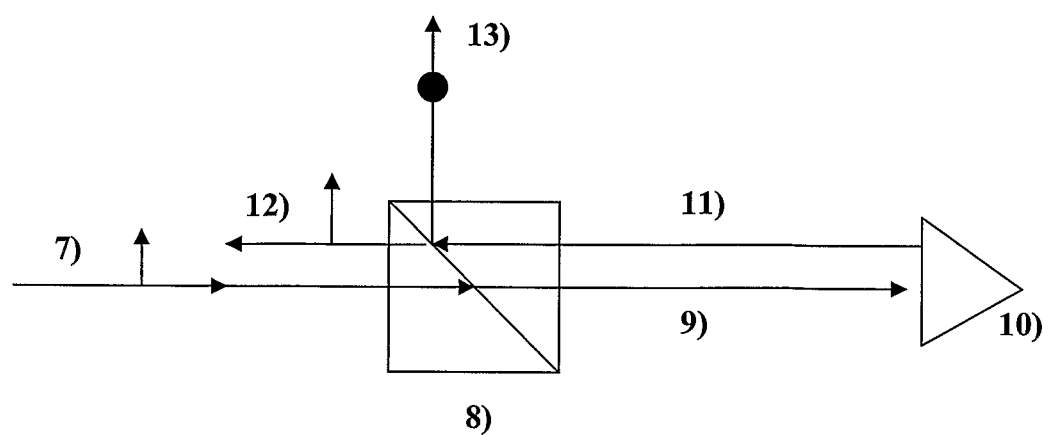
FIG. 2 illustrates a system utilizing a Dielectric Total Internal Reflection Cube-Corner.
Figure 3:
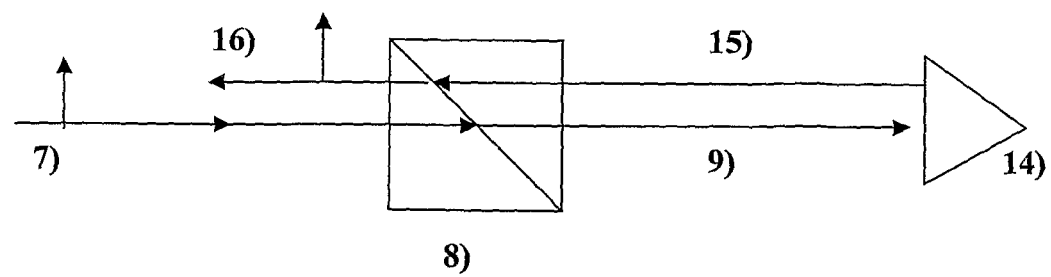
FIG. 3 illustrates a system utilizing a Metal Coated Cube-Corner.
Figure 4:
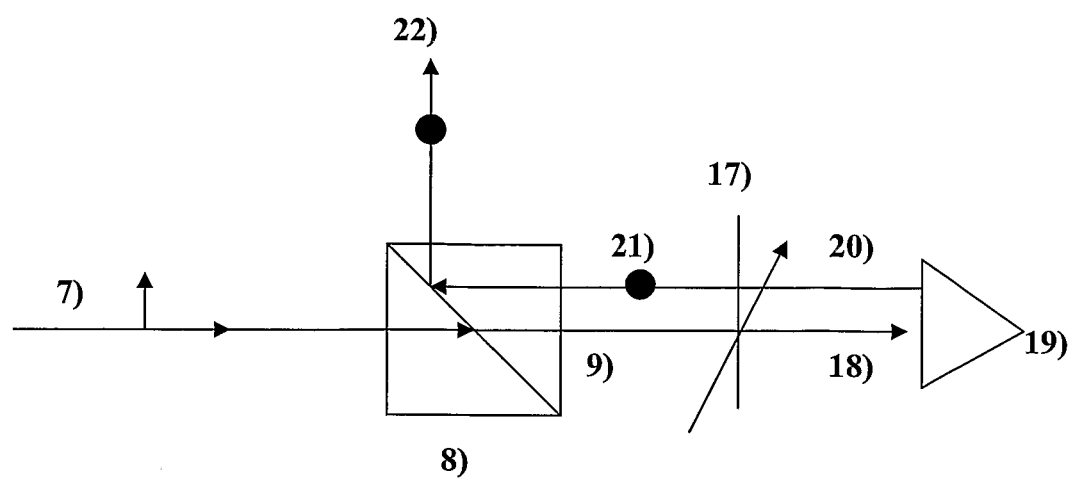
FIG. 4 illustrates a system utilizing a Metal Coated Cube-Corner and a Quarter Wave Linear Retarder.
Figure 5:
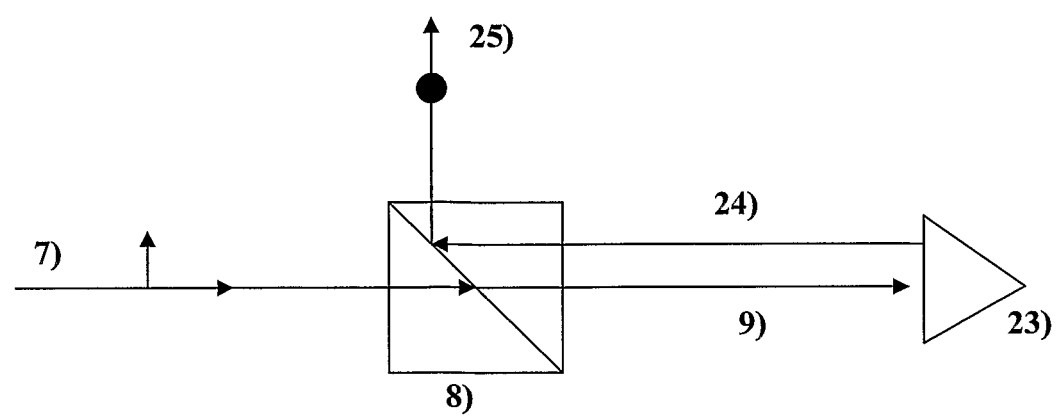
FIG. 5 illustrates a system using a Polarization Orthogonalizing Cube-Corner introduced earlier.

A cube corner consists of 3 mutually perpendicular reflecting planes in a pyramidal configuration. The point at which all three planes intersect is known as the apex of the cube-corner.

In retro-reflecting, any incident ray strikes each of the surfaces once. As there are 3 planes, the order in which the planes are struck has 3 factorial combinations: 123, 132, 213, 231, 312, and, 321. These 6 combinations correspond to six distinct hexads (sub-apertures or non-contiguous wavefronts) on the front surface of the Cube Corner. Calculation of the polarization properties of the cube-corner requires calculation of the polarization properties of each of the six hexads. For each hexad, the calculation of the Mueller matrix is a product of four rotation matrices and three surface reflection matrices (J. Liu and R. M. A. Azzam, "Polarization properties of corner-cube retroreflectors: theory and experiment," Appl. Opt. 36, 1553-1559 (1997), S. E. Segre and V. Zanza, "Mueller calculus of polarization change in the cube-corner retroreflector," J. Opt. Soc. Am. A 20, 1804-1811 (2003), M. S. Scholl, "Ray trace through a corner-cube retroreflector with complex reflection coefficients," J. Opt. Soc. Am. A 12, 1589-(1995), E. R. Peck, "Polarization properties of corner reflectors and cavities," J. Opt. Soc. Am. 52, 253-257 (1962), Kalibjian, Ralph, "Stokes polarization vector and Mueller matrix for a corner-cube reflector", Optics Communications, Volume 240, Issue 1-3, p. 39-68 (2004)). The rotation matrices are derived from the geometric properties of the cube-corner. The surface reflection matrix calculations depend on the type of interface: metallic reflection, total internal reflection, multi-layer coated interface, sub-wavelength grating, etc. The cumulative polarization properties of the cube-corner are contained in the mean of the Mueller matrices for each of the six hexads. To date, all published polarization analyses of the cube-corner retro-reflector have assumed isotropic interfaces. Isotropic surfaces allow the calculation of the surface reflection matrix from the surface amplitude reflection coefficients. (Fresnel Coefficients, Multilayer Film Calculations, etc)

In some applications, it is desirable that an incident ray is not perfectly retro-reflected. A corner-cube can be modified in many ways, including by making the planes slightly non-orthogonal or by curving the reflecting surfaces. Regardless of any minor variations in cube construction, a novel alteration of the polarization state of the returned beam can be accomplished by the novel techniques outlined herein.

The present invention is a cube-corner which has non-isotropic surfaces causing the polarization state of an exiting ray to be orthogonal, or substantially orthogonal to the polarization state of the entering ray for all linear polarization orientations. Since the exiting polarization is orthogonal to the entering linear polarization for all polarizations, the performance of the cube-corner with respect to rotations about the normal to the front face is the same for all orientations, simplifying use.

One embodiment of the present invention is a cube-corner whose surfaces are modified by one or more sub-wavelength gratings or birefringent coatings. More specifically, a cube-corner, having sub-wavelength gratings on all 3 faces, where the retardance of the modified face is 180°, and either (1) linear oriented 45° with respect to the s and p-vectors or (2) elliptical, oriented at 0° with respect to the s and p-vectors and having an ellipticity of 27.5°, or (3) anisotropic surface with a linear retardance of ±72°, as described in paragraph [10] above. Or, a cube-corner having modified reflecting surfaces whose properties are substantially similar to these. Further, this invention covers an array of cube-corners or a sheet of cube-corners having these properties.

Typical metal or dielectric-corner cubes, or corner cubes with back faces metal coated, or corner cubes with back faces coated with multilayer dielectric coatings cannot produce high efficiency polarization conversion. Further, modifications using isotropic thin films cannot produce the desired effect efficiently. Any isotropic surface has properties which are only dependent on the angle of incidence of a ray on the surface but do not depend on the azimuth angle of the ray. For a ray normally incident on the front face of the cube-corner, the angle of incidence for all 3 reflections is 54.7°. Due to geometric factors, there is a 60° rotation of the polarization basis (the s and p-planes) between each reflection. Any total internal reflection isotropic surface has no diattenuation, only retardance which is always oriented along the s and p-planes. Given this constraint, ideal polarization coupling cannot be achieved. A cube-corner having 3 identical isotropic reflecting planes has a theoretical maximum coupling of 0.5. If the 3 reflecting planes are isotropic with different retardances, 75% coupling can be achieved for all incident states, or alternately, coupling of 1 can be achieved for one incident linearly polarized state while another linear state has 0 coupling. These are the theoretical maximums for a cube-corner utilizing isotropic surfaces.

Figure 6:
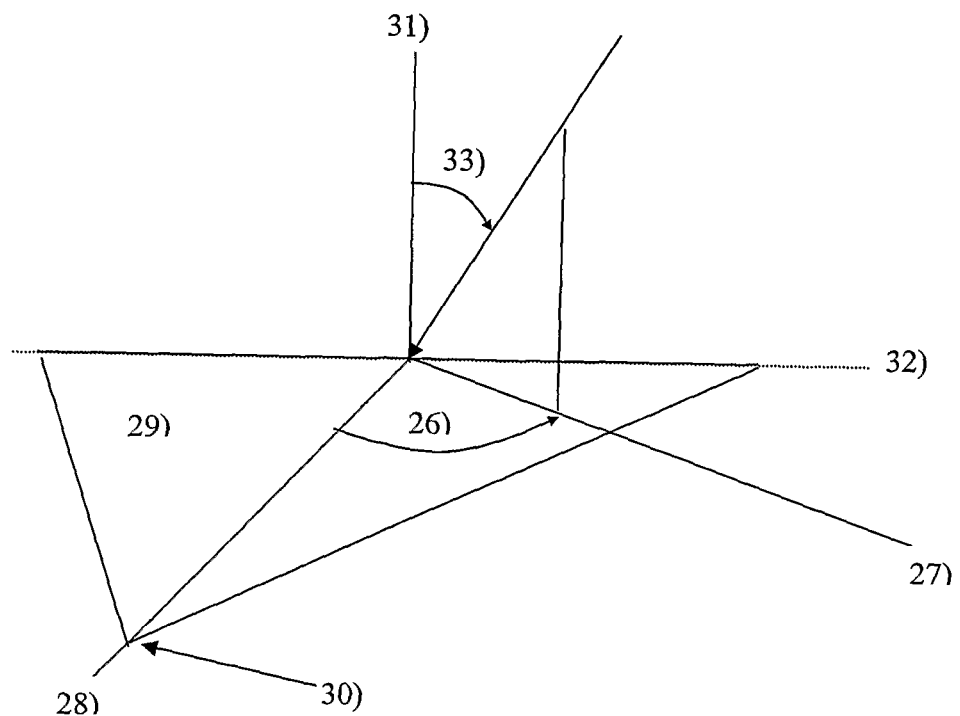
FIG. 6 illustrates an Azimuthal Angle

To produce the desired polarization coupling, the cube-corner in one embodiment of the present invention is modified by placing sub-wavelength gratings on the reflecting planes. A sub-wavelength grating is specified by its shape, period, and aspect ratio. Unlike an isotropic surface, the properties of a surface modified with a sub-wavelength grating are dependent on the azimuthal angle. The surface reflection matrices for a sub-wavelength grating modified surface can be calculated by numerical methods, such as Rigorous Coupled Wave Theory (RCWT) (M. G. Moharam and T. K. Gaylord, "Rigorous coupled-wave analysis of metallic surface-relief gratings," J. Opt. Soc. Am. A 3, 1780-(1986), M. G. Moharam, E. B. Grann, D. A. Pommet, and T. K. Gaylord, "Formulation for stable and efficient implementation of the rigorous coupled-wave analysis of binary gratings," J. Opt. Soc. Am. A 12, 1068-(1995), M. G. Moharam, D. A. Pommet, E. B. Grann, and T. K. Gaylord, "Stable implementation of the rigorous coupled-wave analysis for surface-relief gratings: enhanced transmittance matrix approach," J. Opt. Soc. Am. A 12, 1077-(1995), M. G. Moharam and T. K. Gaylord, "Diffraction analysis of dielectric surface-relief gratings," J. Opt. Soc. Am. 72, 1385-(1982), M. G. Moharam and T. K. Gaylord, "Diffraction analysis of dielectric surface-relief gratings: Erratum," J. Opt. Soc. Am. 73, 411-(1983)). The azimuthal angle 26, as shown in FIG. 6, for a ray 27 normally incident on the corner cube front face 32, are 0° on the first surface, 90° on the second surface, and 0° on the third surface. Also illustrated in FIG. 6 are a line 28 from the cube-corner apex 30 to a point on the edge of the front face 32 centered between two non-apex corners of the reflecting plane 29. Further, a line 31 normal to the reflecting surface 29 is also illustrated with the angle of incidence 33 being shown. A sub-wavelength grating behaves as a retarder, if the period is small enough. Consider, as an example, a usual birefringent retarder which is made of a material where two orthogonal directions have different indices of refraction, $n_1$, and $n_2$. There is one polarization state which is aligned with each index of refraction, such that the polarization state exits the material in the same orientation as it entered, with only the absolute phase changing. Since any incident polarization state can be decomposed into a sum of these two, they form a sufficient basis to describe the behavior of all polarization states. These polarization states are called eigenpolarizations. The retardance is usually defined as the OPD difference between these two polarization states. $\delta = OPD_s - OPD_p$ Suppose, for an azimuthal angle of zero, s-polarized light is aligned with $n_1$, p-polarized light is aligned with $n_2$, and $n_1 > n_2$, so the retardance is positive. Now, for an azimuthal angle of 90°, the s-polarization state is aligned with $n_2$, and the p-polarization is aligned with $n_1$. In this case, the retardance is $n_2 - n_1 < 0$, so the retardance of the surface has become negative, by simply changing the azimuthal angle. Sub-wavelength gratings exhibit similar behavior. This means, if all the surfaces of the corner cube have identical anisotropic surfaces, that a ray which entered the corner cube normal to the front surface will, on the second reflection, see the negative of the retardance it sees on the first and third reflections. Due to this property of the anisotropic surfaces, ideal polarization coupling can be achieved. There is no previously known method which can achieve ideal polarization coupling.

There exist an uncountably infinite set of substantially similar solutions producing a substantially orthogonalizing cube-corner. Here a substantially similar solution is to mean that the specific retardance magnitude, retardance orientation, or other parameters are not exactly the same as those above, but the resulting corner cube still produces a polarization coupling close to the ideal. Any embodiment which has polarization coupling less than the previously known maximum, 75%, cannot be considered to be close to ideal.

Figure 7:
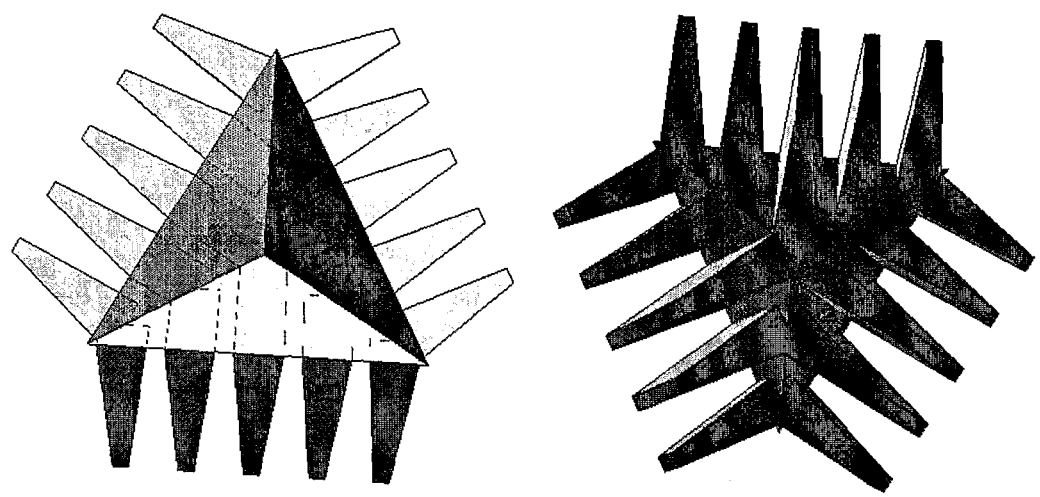
FIG. 7 is a top and bottom view of a triangular 1.175 μm cube-corner with sub-wavelength gratings.

One particular solution which satisfies the desired polarization effect is a cube-corner of solid PMMA, or other material with a refractive index of approximately 1.49, with 3 identical reflecting planes, each modified with a symmetric sub-wavelength grating of trapezoidal cross section having a period of 235 nm and an aspect ratio of 2.25 as shown in FIG. 7.

Alternately, perfect polarization coupling can be obtained by placing birefringent coatings on the reflecting planes. Birefringent coatings have the ability to shift the orientation of the retardance out of the s or p planes. This is sufficient to allow ideal polarization coupling. For example, if all 3 interfaces have 45° oriented half wave retardance, ideal polarization coupling is achieved.

Additionally, a number of definitions may be helpful in understanding the present invention. A sub-wavelength grating is defined as a one-dimensional diffractive structure, such as a diffraction grating, whose period is less than one wavelength at the design wavelength. Depending on design specifics, a sub-wavelength grating can suppress non-zero diffraction orders, increasing the efficiency into the zeroth order. These gratings can also modify the retardance and diattenuation of an interface. By careful design, a sub-wavelength grating on a totally reflecting surface can have unity reflectance (diffraction efficiency) into the zeroth order diffracted beam while generating a retardance whose major axis not oriented along the s or p-plane of the reflection, and can generate elliptical or linear retardance.

Azimuthal Angle 26, as used here, the term azimuthal angle is the angle, in the plane of the reflecting surface 29, of the incident ray relative to a line perpendicular to the edge of the front face 32 as shown in FIG. 6.

Aspect ratio is the ratio of the amplitude (or depth, for surface relief gratings) of a grating divided by the period of the grating.

Polarization Coupling, the Linear Polarization Coupling associated with an optic described by a Mueller matrix for reflection, is defined as the vector, matrix, vector product $$PolarizationCoupling[\theta] = \\ (1, \cos[2\theta], -\sin[2\theta], 0)\frac{1}{2m_{00}}\begin{pmatrix} m_{00} & m_{01} & m_{02} & m_{03} \\ m_{10} & m_{11} & m_{12} & m_{13} \\ m_{23} & m_{21} & m_{22} & m_{23} \\ m_{30} & m_{31} & m_{32} & m_{33} \end{pmatrix}\begin{pmatrix} 1 \\ \cos[2\theta] \\ \sin[2\theta] \\ 0 \end{pmatrix}$$

and is a measure of the fraction of incident linearly polarized irradiance which is retro-reflected into the orthogonal polarization state as a function of the incident polarization orientation, $\theta$. The minus sign on $\sin[2\theta]$ is due to the coordinate system change for Stokes vectors in reflection. A polarization coupling of 1 indicates perfect orthogonalization for that $\theta$. This invention provides a method to obtain a polarization coupling of 1 for all $\theta$.

A polarization coupling less than one indicates that a portion of the incident linearly polarized light is returned in the same polarization state as the polarization of the incident light. A perfectly depolarizing cube-corner, returning unpolarized light when linearly polarized light is incident, would have a polarization coupling of ½.

Perfect orthogonalization for all incident linear polarizations, in reflection, occurs only when the corner cube Mueller matrix is $$\begin{pmatrix} 1 & 0 & 0 & 0 \\ 0 & -1 & 0 & 0 \\ 0 & 0 & 1 & 0 \\ 0 & 0 & 0 & -1 \end{pmatrix}$$

for all six hexads individually, and for their spatial average.

One unique feature of the invention can be understood through consideration of the Mueller matrices associated with the three reflections through the corner cube. The Mueller matrix for a linear retarder in transmission of retardance, $\delta$, with the fast axis oriented at an angle $\theta$ is $$LR(\delta, \theta) = \begin{pmatrix} 1 & 0 & 0 & 0 \\ 0 & \cos^2 2\theta + \cos\delta\sin^2 2\theta & (1-\cos\delta)\cos 2\theta\sin 2\theta & -\sin\delta\sin 2\theta \\ 0 & (1-\cos\delta)\cos 2\theta\sin 2\theta & \sin^2 2\theta + \cos\delta\cos^2 2\theta & \sin\delta\cos 2\theta \\ 0 & \sin\delta\sin 2\theta & -\sin\delta\cos 2\theta & \cos\delta \end{pmatrix}$$

For a linear retarder in reflection, left side matrix multiplication with a half wave retardance of the same orientation is included in the Mueller matrix, (LR($\pi,\theta$)☐LR($\delta,\theta$))

because of the sign conventions applying to reflection.

One hexad of a corner cube with identical isotropic surfaces is characterized by the Mueller matrix sequence LR($\pi$,120°)☐LR($\delta$,120°)☐LR($\pi$,60°)☐LR($\delta$,60°)☐ LR($\pi$,0)☐LR($\delta$,0).

$\delta$ is the retardance of the isotropic interface at the nominal 54.7° angle of incidence. The retardance remains the same for the three surfaces but the orientation of the s and p planes rotates between the interfaces. A thorough study of this equations shows that the maximum average polarization coupling is only 0.75. This Mueller matrix can never equal the ideal Mueller matrix of [38].

For three anisotropic interfaces oriented along the s or p-orientation, the equation of [40] is modified such that the second reflection has the form LR($\pi$,60°)☐LR($-\delta$,60°), the sign of the retardance has changed for the reasons explained in [29]. For three identical s-p anisotropic interfaces the Mueller matrix is LR($\pi$,120°)☐LR($\delta$,120°)☐LR($\pi$,60°)☐LR($-\delta$,60°)☐ LR($\pi$,0)☐LR($\delta$,0).

Now it is observed that ideal polarization coupling is obtained for all polarization orientations when $\delta=70.52°$ and the Mueller matrix becomes the matrix of [38]

$$\begin{pmatrix} 1 & 0 & 0 & 0 \\ 0 & -1 & 0 & 0 \\ 0 & 0 & 1 & 0 \\ 0 & 0 & 0 & -1 \end{pmatrix}.$$

This configuration is one of the simplest and most desirable of the configurations set forth in this invention, because a subwavelength grating can be readily designed and fabricated with rulings in the p-plane with the target 70.52° retardance.

When the rulings of a sub-wavelength grating are not aligned along the p or s-planes, then linear retardances of other orientations and also elliptical retardances can be obtained, and a study of the equation of [41] generalized to this more arbitrary case shows other retarder configurations capable of producing ideal polarization coupling for all orientations. Among these solutions are three identical anisotropic surfaces with the following properties for the retardance, $\delta$, orientation of the major axis $\theta$, and latitude of the eigenpolarization on the Poincaré sphere, $\xi$:

| $\delta$ | $\theta$ | $\xi$ |
|---|---|---|
| 70.52° | 0° | 0° |
| 180° | 16° | 0° |
| 70 | 30° | 0° |
| 180° | 45° | 0° |
| 180° | 75° | 0° |
| 60° | 105° | 0° |
| 120° | 132° | 0° |

Figure 8:
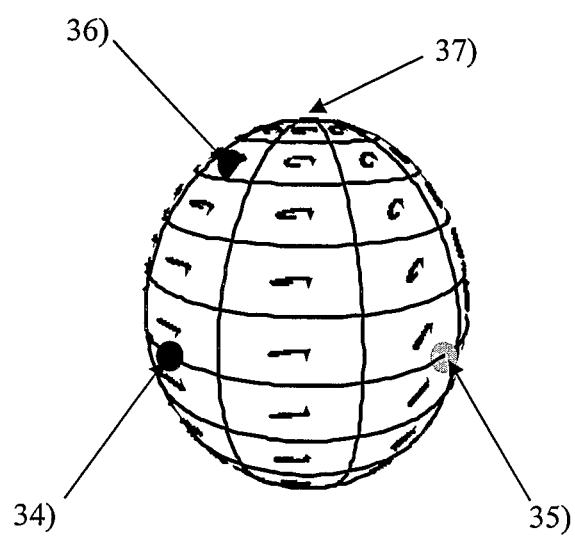
FIG. 8 shows the polarization eigenstates of the various claims on the Poincaré sphere.

The Poincaré sphere is illustrated in FIG. 8. In FIG. 8, an Eigenstate 34, where each reflecting plane is anisotropic having a retardance of +70° when the azimuthal angle is zero, and a linear retardance of −70° when the azimuthal angle is 90°, is illustrated with 0° linear. Further, FIG. 8 shows an Eigenstate 35, where each reflecting plane has a surface with a linear retardance of 180° oriented at 45° with respect to the s and p planes of the surface of the reflecting plane. In addition, FIG. 8 shows an Eigenstate 36, where each reflecting plane has a surface with a retardance of 180 degrees, and where the eigenstate for the reflecting surface is elliptically polarized and has its major axis oriented in the p-plane of the surface of the reflecting plane with an ellipticity angle of 27.5%, and the other polarization eigenstate is substantially orthogonal. Finally, FIG. 8 shows the north pole 37 of the Poincaré Sphere is Right Circular polarized light.

Figure 9:
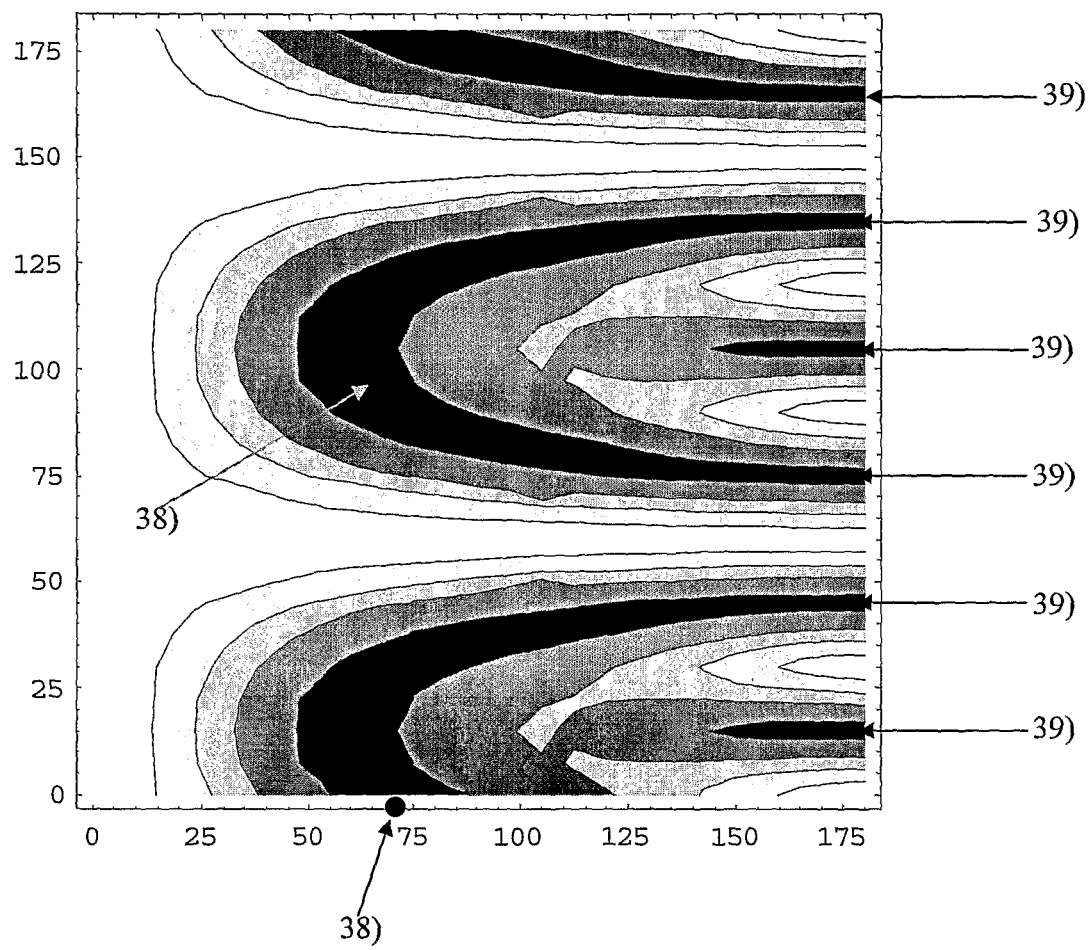
FIG. 9 shows region of solutions for a linear polarization orthogonalizing cube-corner with identical anisotropic surfaces with linearly polarized polarization eigenstates. Regions of solution are indicated by the darkest band. The horizontal axis is the retardance and the vertical axis is the orientation. Only the solutions along the lower axis (38) and the horizontal line through 90 degrees (39) have eigenstates aligned with the s and p planes and are therefore the most easily implemented.

In fact there are several continuous families of solutions for three identical anisotropic interfaces with linearly polarized eigenstates as shown by the black bands 39 in FIG. 9 which represents the distance of the Mueller matrix corresponding a particular type of retarding anisotropic surface from the ideal Mueller matrix of [38] as a function of δ along the bottom axis in degrees, and θ along the vertical axis in degrees. The darkest band in the contour plot indicates solutions closest to [38]. Again, the most desirable solution is the p-oriented solution of [41] shown in FIG. 9 as 38.

Figure 10:
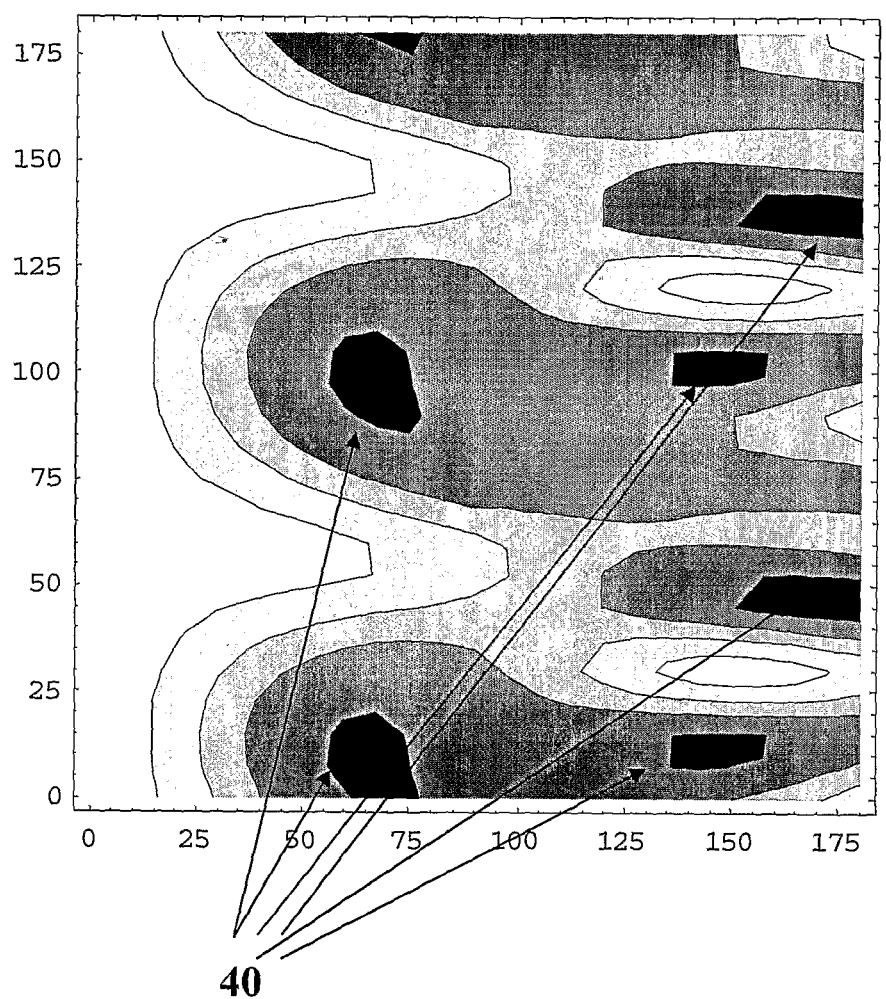
FIG. 10 shows a subset of solutions for a linear polarization orthogonalizing corner cube with identical anisotropic surfaces with elliptically polarized eigenstates located at a latitude of 25° on the Poincaré sphere. The horizontal axis is the retardance and the vertical axis is the orientation.

Additional solutions are found for identical anisotropic surfaces when the polarization eigenstates are elliptical, as happens when sub-wavelength gratings have their pattern rotated away from the s or p-orientation. FIG. 10 plots those solutions 40 in black for polarization eigenstates at a latitude of 25° on the Poincaré sphere for all values of surface retardance from 0 to 180° (half wave). A corresponding plot is obtained for all latitudes between −90° and 90°, but solutions 40 are only found from −60° to 60° latitude.

Numerous modifications and variations of the present invention are possible in light of the above teachings. For example, either a sub-wavelength grating or a birefringent coating can be applied to either monolithic cube-corners, sheets of cube-corners, or arrays of cube-corners. Different anisotropic interfaces may be applied to the different surfaces, or only one or two of the surfaces might be anisotropic. This invention is concerned with an entirely new polarization modification, not the manufacturing details.

The particular implementation of the present invention may be varied while still remaining within the scope of the present invention. It is therefore to be understood that within the scope of the appended claims and their equivalents, the invention may be practiced otherwise than as specifically described herein.

The invention claimed is:

1. A cube corner retro-reflector, comprising:
   three mutually perpendicular reflecting planes arranged in a pyramidal configuration,
   wherein at least one of the reflecting planes has a non-isotropic surface causing a polarization state of a ray exiting the cube corner retro-reflector to be orthogonal or substantively orthogonal to a polarization state of a ray entering the cube corner retro-reflector for all linear polarization orientations.

2. The cube corner retro-reflector of claim 1, wherein at least one reflecting plane has at least one sub-wavelength grating.

3. The cube corner retro-reflector of claim 1, wherein the at least one reflecting plane has a birefringent coating.

4. The cube corner retro-reflector of claim 1, wherein each reflecting plane has a surface with a retardance of 180 degrees and where one of the polarization eigenstates for the reflecting surface is elliptically polarized and has its major axis oriented in the p-plane of the surface of the reflecting plane with an ellipticity angle of 27.5%, and the other polarization eigenstate is substantially orthogonal.

5. The cube corner retro-reflector of claim 1, wherein each reflecting plane has a surface with a linear retardance of 180° oriented at 45° with respect to the s and p planes of the surface of the reflecting plane.

6. The cube corner retro-reflector of claim 1, wherein each reflecting plane is anisotropic having a retardance of +70° when the azimuthal angle is zero, and a linear retardance of −70° when the azimuthal angle is 90°.

7. The cube corner retro-reflector of claim 1, wherein each reflective plane has a diattenuating surface.

8. A planar array comprising a plurality of the cube corner retro-reflectors recited in claim 1.

9. The cube corner retro-reflector of claim 1, wherein at least one reflecting plane is anisotropic with linear or elliptically polarized eigenstates and the Mueller matrix associated with at least one hexad approximates the ideal polarization conversion Mueller matrix (4×4 matrix) T{{1,0,0,0},{0,−1,0,0},{0,0,1,0},{0,0,0,−1}} and the multiplicative constant T represents the polarization state independent losses, such as absorption or front surface reflection loss, associated with propagating through the cube-corner.

10. A detecting system for detecting changes in an irradiance beam, comprising:
   an optical source configured to create an irradiance beam;
   a polarized beam splitter having first and second sides and configured to receive the irradiance beam from the optical source into the first side;
   a cube corner retro-reflector according to claim 1 configured to receive the resultant beam from the first side of the polarized beam splitter and to retransmit the beam to the second side of the polarized beam splitter; and
   a detector unit configured to detect changes in the irradiance beam received from the second side of the polarized beam splitter.

11. The detecting system of claim 10, wherein at least one reflecting plane has at least one sub-wavelength grating.

12. The detecting system of claim 10, wherein the at least one reflecting plane has one birefringent coating.

13. The detecting system of claim 10, wherein each reflecting plane has a surface with a retardance of 180 degrees and where one of the polarization eigenstates for the reflecting surface is elliptically polarized and has its major axis oriented in the p-plane of the surface of the reflecting plane with an ellipticity angle of 27.5%, and the other polarization eigenstate is substantially orthogonal.

14. The detecting system of claim 10, wherein each reflecting plane has a surface with a linear retardance of 180° oriented at 45° with respect to the s and p planes of the surface of the reflecting plane.

15. The detecting system of claim 10, wherein each reflecting plane is anisotropic having a retardance of +70° when the azimuthal angle is zero, and a linear retardance of −70° when the azimuthal angle is 90°.

16. The detecting system of claim 10 wherein each reflective plane has a diattenuating surface.

\* \* \* \* \*